Oct. 16, 1928.  L. M. WOOLSON  1,687,917
INTERNAL COMBUSTION ENGINE
Filed July 2, 1925
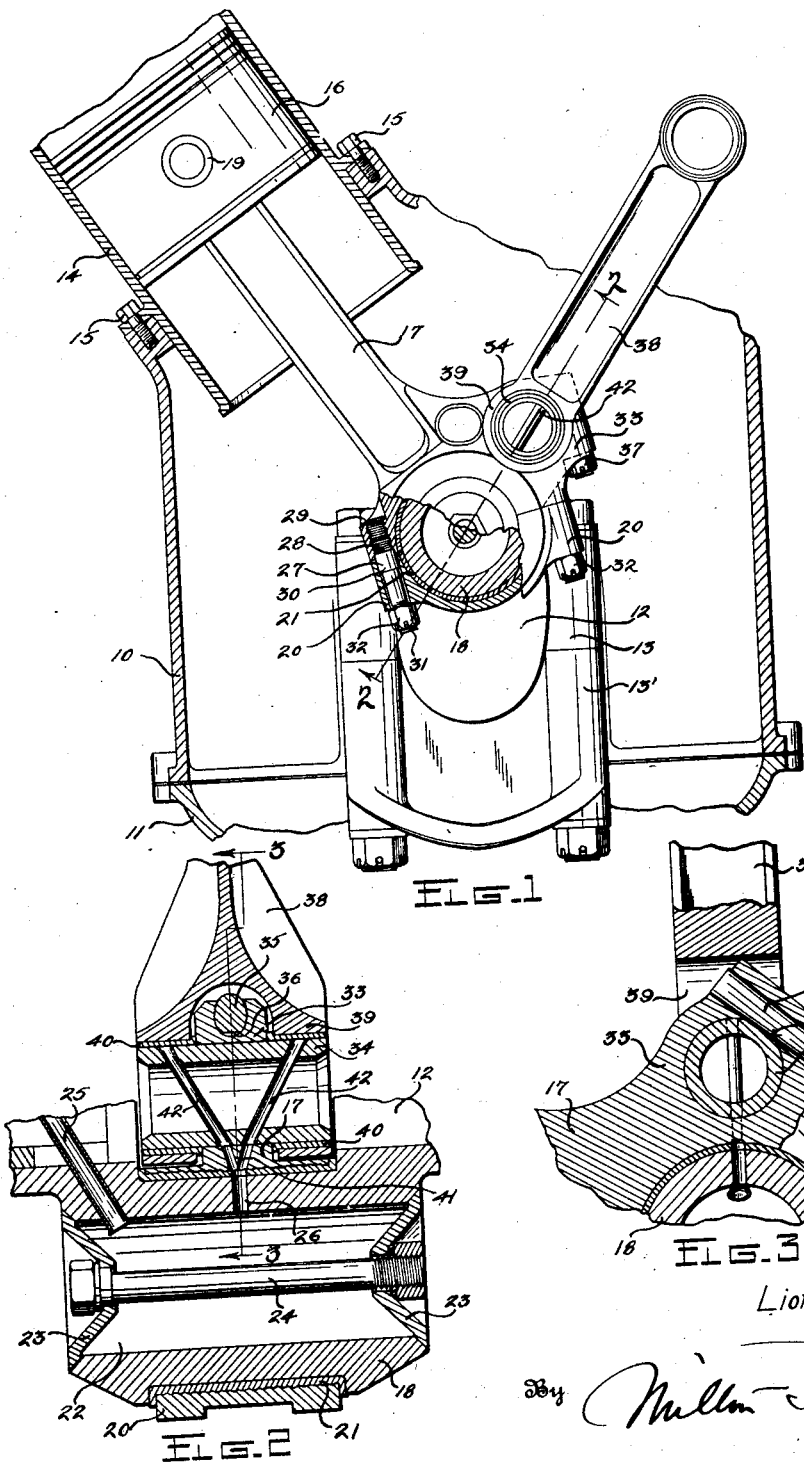

Patented Oct. 16, 1928.

1,687,917

UNITED STATES PATENT OFFICE.

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN.

INTERNAL-COMBUSTION ENGINE.

Application filed July 2, 1925. Serial No. 40,982.

This invention relates to internal combustion engines, and particularly to the connecting rod construction thereof.

The invention is especially concerned with aircraft engines and its object is the reduction of weight in such engines.

Reduction of weight in aircraft engines is obviously most desirable, and reduction of weight in reciprocating parts of the engine is doubly desirable, first, because of the actual reduction in weight, making a higher ratio of horse power to weight, and second, because the reduction of weight in reciprocating parts of the engine tends to lessen the vibration, and in some cases, increases the horse power.

Most of the aircraft engines built today are of the multi-cylinder type so that if a few ounces reduction of weight can be made in the parts that go to make up a cylinder unit, that reduction is multiplied by the number of cylinders and the total reduction may be several pounds. The present invention is directed to the reduction of weight and strengthening of the connecting rod parts of an engine so that greater power per pound may be produced, and greater strength and, consequently, reliability effected.

Other objects and advantages of the invention will appear from the following description taken in connection with the drawings, which form a part of this specification, and in which:

Fig. 1 is a vertical transverse section through an internal combustion engine embodying the invention;

Fig. 2 is a view substantially on the line 2—2 of Fig. 1; and

Fig. 3 is a view substantially on the line 3—3 of Fig. 2.

Referring to the drawing, 10 represents the main supporting part of the crank case of an internal combustion engine, and 11 is the bottom pan or cover which is properly secured thereto to form an enclosure for the engine crank shaft. The crank shaft is indicated at 12 and is mounted in suitable bearings 13 in the crank case. A suitable bearing cap 13' is detachably secured in place as shown.

The engine shown is of the V type, and one of the cylinders is indicated at 14, being supported on the crank case and secured thereto as by bolts 15. One of the pistons 16 is shown in the cylinder 14, and it will be understood that there is another cylinder and piston on the other side of the engine mounted substantially sixty degrees from the center line of the cylinder shown.

A connecting rod 17 is shown extending between the piston 16 and the crank pin 18 of the crank shaft 12. This connecting rod 17 is pivotally connected to the pin 16 as by a piston pin 19, and it is adapted to bear on the crank pin 18 as shown particularly in Fig. 1. The big end, or crank shaft end, of the connecting rod 17 has a cap 20 which is detachably secured to it and suitable bearing metal 21 is cast or otherwise secured in the connecting rod and cap where those parts surround the crank pin 18.

In Fig. 2 the crank pin 18 is shown in some detail, and it will be seen it is drilled out, as at 22, to provide an oil reservoir, the ends of the reservoir being closed by disks 23 connected by a bolt 24. The reservoir 22 is fed with oil under pressure by a pipe or conduit 25 leading from the interior of the main bearing part of the crank shaft. One or more oil feed conduits 26 are formed radially in the crank pin 18, thus leading the oil to the crank pin bearing.

In order that the big end of the connecting rod 17 and its cap 20 may be formed of as little metal as possible to thereby make them light, the cap is secured on the connecting rod end by means of studs 27, which studs are threaded into the connecting rod end as shown at 28, and riveted over as shown at 29. The middle part of each of these studs 27 forms a dowel 30 for the cap 20, and the outer end 31 is threaded to receive a nut 32 for securing the cap in place. By thus permanently securing the studs 27 in the end of the connecting rod, the use of additional dowel pins is dispensed with, and the use of heads on the usual bolts is avoided. Also, when headed bolts are used for securing the cap in place, much larger counter-sinking is required in the connecting rod end, and thus the connecting rod is greatly weakened, and in order to prevent weakening of the connecting rod, it must be made much heavier. All three of these points make for lightness in the connecting rod of the present construction.

The big end of the connecting rod 17 is formed with an unbroken or solid integral eye 33 which is adapted to receive a cross pin 34 which is of hollow open ended construction and thus easily carbonized. The cross pin 34 extends beyond the sides of the eye 33 and is retained or secured in place in the eye, both against rotation and end-wise movement, by a tapered pin 35 and a flat spot 36 on the side of the pin, and nut 37 draws the tapered pin 35 into position.

A second connecting rod 38, adapted for pivotal connection at its upper end with a piston similar to the piston 16, is formed with a lower forked end as at 39 so that it straddles the eye 33. The forked end of the connecting rod 38 is pivoted upon the projecting parts of the cross pin 34, suitable bearing sleeves or bearing metal 40 being provided as shown in Fig. 2. These parts are assembled by alining the openings in the forked end of the connecting rod 38 with the opening of the eye 33 and then inserting the cross pin 34 and securing the latter in place in the eye 33 by means of the tapered pin 35.

Oil conduit means in the form of drilled openings 41 are provided in the end of the connecting rod 17, this conduit means leading to the interior of the eye 33 and connecting with the drilled opening 26 in the crank pin at each revolution of the connecting rod on the crank pin. For the purpose of lubricating the bearings of the forked end of the connecting rod 38 on the cross pin 34, the latter is provided with two diagonally arranged conduits 42 which extend from the outlets of the conduit means 41 to the bearings of the connecting rod 38. Thus these bearings are fully lubricated without the added weight of closing disks for the ends of the cross pin 34.

By thus securing the cross pin 34 in an unbroken eye formed on the connecting rod end, the amount of metal in the eye itself and the adjacent parts of the connecting rod may be considerably cut down, thereby lessening the total weight of the connecting rod, and the thickness of the eye may be made less because it is not necessary to have an oscillating bearing in it. All of this may be done without lessening the amount of bearing surface for the connecting rod 38 on the cross pin 34 so that there is no sacrifice of reliability in this respect.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope or my invention.

What is claimed is:

1. In an internal combustion engine, the combination of a crank shaft having a crank pin, a connecting rod having an end adapted to bear on said crank pin, a bearing cap for said end of the connecting rod, studs threaded into said end of the connecting rod and riveted in place, said studs forming dowels for said cap, and nuts for said studs for retaining the cap in place on the connecting rod end.

2. In an internal combustion engine, the combination of a connecting rod having an end adapted to bear on the engine crank pin, said end having an integral eye thereon, a cross pin secured against rotation in said eye, and projecting from the sides thereof, a second connecting rod having a forked end pivoted on the projecting ends of said cross pin, oil channel means through a wall of said eye to the exterior of the cross pin, and an oil tube extending from said channel means to the bearing of said second connecting rod on the projecting end of said pin.

3. In an internal combustion engine, the combination of a connecting rod having an end adapted to bear on the engine crank pin, said end having an integral eye thereon, a cross-pin secured against rotation in said eye, and projecting from the sides thereof, a second connecting rod having a forked end pivoted on the projecting ends of said cross pin, oil channel means through a wall of said eye to the exterior of the cross pin, and diagonally arranged oil tubes in said cross pin extending from said channel means to the forked end bearing of said second connecting rod on the ends of said cross pin.

4. In an internal combustion engine, the combination of a connecting rod having an end adapted to bear on the engine crank pin, said end having an integral eye formed thereon, a hollow open ended cross pin secured against rotation in said eye, a second connecting rod having a forked end bearing on the cross pin on both sides of said eye, oil conduit means in the connecting rod leading to the interior of said eye, and pipes in the cross pin extending from said conduit means to the bearing of the second connecting rod on said cross pin.

In testimony whereof I affix my signature.

LIONEL M. WOOLSON.